(12) United States Patent
Arai et al.

(10) Patent No.: US 6,362,929 B1
(45) Date of Patent: Mar. 26, 2002

(54) METHOD AND APPARATUS FOR RETRACTING A TRANSDUCER HEAD FROM A RECORDING MEDIUM IN A DISK DRIVE STORAGE DEVICE

(75) Inventors: Koichi Arai, Fujisawa; Yasuhiro Kotani, Yamato; Taku Kitagawa, Fujisawa, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/189,075

(22) Filed: Nov. 9, 1998

(30) Foreign Application Priority Data

Nov. 28, 1997 (JP) .............................. 9-328517

(51) Int. Cl.$^7$ ............................. G11B 21/02
(52) U.S. Cl. ...................................... 360/75
(58) Field of Search ...................... 360/75, 69

(56) References Cited

U.S. PATENT DOCUMENTS

| | | | | |
|---|---|---|---|---|
| 5,889,629 A | * | 3/1999 | Patton, III | 360/75 |
| 5,969,899 A | * | 10/1999 | Utenick et al. | 360/78.04 |
| 6,025,968 A | * | 2/2000 | Albrecht | 360/75 |
| 6,188,192 B1 | * | 2/2001 | Chen | 318/563 |

FOREIGN PATENT DOCUMENTS

| | | | |
|---|---|---|---|
| JP | 55144670 | 11/1980 | H01R/25/16 |
| JP | 56106575 | 8/1981 | A23L/1/325 |
| JP | 62293572 | 12/1987 | G11B/5/40 |

* cited by examiner

Primary Examiner—David Hudspeth
Assistant Examiner—Dan I. Davidson
(74) Attorney, Agent, or Firm—Noreen A. Krall; Robert B. Martin; Lewis L. Nunnelley

(57) ABSTRACT

The present invention provides a retract circuit for a disk drive storage device that increases the reliability of a disk drive, and reduces the manufacturing cost. If the power supply of the disk drive is turned off, the retract circuit receives the current due to a back electromotive force from a spindle motor and clips it to a predetermined value or below, and supplies the current equal to or smaller than the predetermined value to the voice coil of a VCM. Then, the VCM drives a carriage, which swings to retract a head slider to the landing area of the disk. If the power is turned off, an FET transistor is turned on, and the current due to the back electromotive force is supplied to the voice coil via the FET transistor, a resistor, and a second FET. If the current due to the back electromotive force exceeds a predetermined value depending on the value of the resistor, two transistors are turned on. Since this turns off the second FET transistor to shut off the current supply path, the supplied current is clipped to the above predetermined value, and thus the rotational speed of the carriage is also limited.

1 Claim, 4 Drawing Sheets

METHOD AND APPARATUS FOR RETRACTING A TRANSDUCER HEAD FROM A RECORDING MEDIUM IN A DISK DRIVE STORAGE DEVICE

BACKGROUND OF THE INVENTION

1. Field of the Invention

The present invention relates to a disk drive storage device and more particularly to a circuit for supplying current due to a back electromotive force generated by the spindle motor to the voice coil motor when the power for the disk device is turned off in order to retract the transducer head to the landing area of the disk recording medium or unload it from the disk recording medium.

2. Description of Related Art

A disk drive storage device comprises a disk which is a medium for recording data, a spindle motor for rotating the disk, a head slider, a carriage, a voice coil motor (VCM), a crash stop, etc. within a disk enclosure, and comprises, on the external surface of a disk enclosure, a circuit board (card assembly) on which an MPU, a spindle driver, a VCM driver, a circuit for retracting (hereinafter simply referred to as a retract circuit), etc. are mounted.

The carriage has a head arm for supporting the head slider, and a coil arm for supporting the voice coil of the VCM. The head slider includes a transducer head for performing a data read/write to the disk. The VCM driver drives the VCM by feeding a current (VCM current) through the voice coil. The VCM swings the carriage. The head arm and the coil arm are extending in the direction opposite to each other with respect to the pivot of the carriage. The crash stop is fixed to the disk enclosure, and hit by the coil arm to define the swing range of the carriage.

In the disk drive storage device, the VCM and the carriage move the head slider to above the data area of the disk, and retract the head slider from above the data area and move it to the landing area of the disk. The head slider is floating over the disk surface when the disk is rotating, and it lands on the disk surface when the disk stops its rotation. Disk damage may occur if the head slider lands on the data area of the disk and thus, the head slider must be retracted to a landing area and must land on the landing area when the disk stops its rotation. The VCM current for retracting the head slider is called a retract current.

The spindle driver and the VCM driver operate on the power supplied to the disk drive storage device. The disk stops its rotation when the power to the disk drive is turned off, and the VCM driver also stops its operation, so that the retract current cannot be fed to the voice coil from the VCM driver. When the device power is turned off, the retract circuit feeds the current due to a back electromotive force generated by the spindle motor through the voice coil as the retract current to retract the head slider. The retraction of the head slider by the retract circuit when the device power is turned off is sometimes called power-off retraction to be distinguished from the retraction of the head slider when the power is being supplied. Hereinafter, a simple designation of "retraction" means the retraction by the retract circuit when the device power is turned off, and a simple designation of "retract current" means the retract current supplied from the retract circuit.

Even if the device power is turned off to stop the driving of the spindle motor, the disk continues to rotate for a while by the inertia, allowing the spindle motor to generate a back electromotive force. The magnitude of the back electromotive force depends mainly upon the preset rotational speed of the spindle motor. The retract current increases as the current due to the back electromotive force increases, and the swing speed of the carriage increases as the retract current increases. Accordingly, the swing speed of the carriage varies depending on the preset rotational speed of the spindle motor.

When the device power is turned off, the carriage swings the head slider in the direction of the landing area, and stops its swing when the coil arm abuts on a crash stop. When the carriage stops its swing, the head slider is positioned over the landing area, and when the disk stops its rotation, the head slider lands on the landing area.

However, in the above conventional disk device, the swing speed of the carriage in the retraction depends on the retract current, as described above, and the retract current value depends on the preset rotational speed of the spindle motor. Thus, if the preset rotational speed of the spindle motor is large, the swing speed of the carriage in the retraction becomes large, and the shock given when the carriage hits the crash stop becomes large. Conversely, if the preset rotational speed is low, the retract current becomes small, resulting in an unstable retract operation. This has been a problem in increasing the reliability of disk devices when the retract circuit is shared between a plurality of disk devices which are different in the preset rotational speed of the spindle motor.

The above problem can be solved by changing the circuit constants of the retract circuit such as the resistance value according to the preset rotational speed of the spindle motor. However, one problem associated with this approach is that the manufacturing cost of disk drive increases because a different card assembly (a circuit board on which the retract circuit and the like are mounted) must be prepared for each of the disk drives which are different in the preset rotational speed of the spindle motor.

Accordingly, it can be seen that there is a need in the art to provide a retract circuit for a disk drive storage device which can be shared between a plurality of disk drives having different preset spindle motor rotational speeds.

SUMMARY OF THE INVENTION

To overcome the shortcomings of the prior art described above, it is an object of the present invention is to provide a retract circuit for a disk drive storage device that can be shared between a plurality of disk drives having different preset spindle motor rotational speeds. It is the further object of the invention to provide a retract circuit that has improved reliability as well as a reduced manufacturing cost.

To accomplish the above objects, the retract circuit of the present invention is characterized in that, if the current due to a back electromotive force which is received from the spindle motor exceeds a predetermined value, this current is clipped or sliced so as to be limited to the predetermined value or below, and the current equal to or below the predetermined value is supplied to the voice coil motor.

One advantage of the present invention is that the same card assembly can be used across disk drives having different rotation speeds for the spindle motor.

Another advantage of the present invention is that it can be implemented without increasing the manufacturing cost of the disk drive storage device.

Still another advantage of the present invention is that it provides a disk drive storage device having a more stable retract operation.

The above, as well as additional objects, features and advantages of the present invention will become apparent in the following detailed written description.

DETAILED DESCRIPTION OF THE PREFERRED EMBODIMENT

Figure 1:
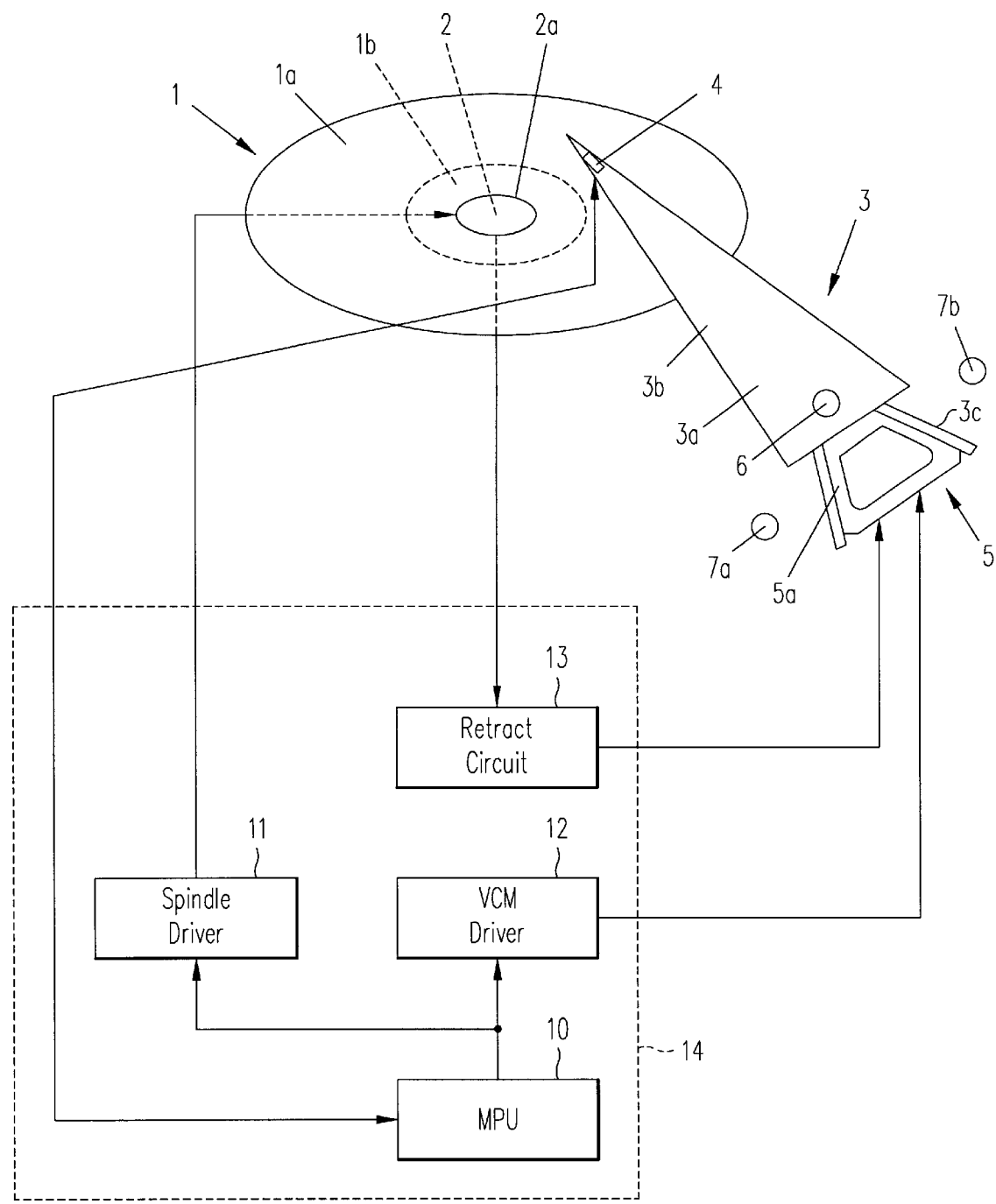
FIG. 1 is a simplified block diagram showing the construction of the disk drive storage device of an embodiment of the present invention.

FIG. 1 is a simplified block diagram showing the construction of the disk device of an embodiment of the present invention. The disk device shown in FIG. 1 comprises a disk 1 which is a data recording medium, a spindle motor 2, a carriage 3, a head slider 4, a voice coil motor (VCM) 5, a crash stop 7, etc. in a disk enclosure, not shown, and comprises, on the outer surface of the disk enclosure, a card assembly 14 on which an MPU 10, a spindle driver 11, a VCM driver 12, a retract circuit 13, etc. are mounted. To the disk device of FIG. 1, a +5 [V] power and a +12 [V] power are externally supplied (not shown).

The disk 1 is fixed to the spindle shaft 2a of the spindle motor 2. The disk 1 surface consists of a data area 1a, and a landing area 1b provided at an inner diameter from the data area 1a. To the data area 1a, data is written by a transducer head (not shown) which is included in the head slider 4. The spindle motor 2 is driven by the spindle driver 11 to rotate the disk 1. The spindle motor 2 generates a three-phase back electromotive force when the disk 1 is rotating. Even if the driving of the spindle motor 2 by the spindle driver 11 is stopped, the disk 1 continues a rotation for a while by its own inertia, and the spindle motor 2 continues to generate the back electromotive force until the disk 1 stops its rotation, even if its driving by the spindle driver 11 is stopped.

The carriage 3 is made up of a middle part 3a fitted over the pivot 6 for free swing, which is provided on the disk enclosure so as to project from the enclosure, and a head arm 3a and a coil arm 3c which are extending from the middle part 3a in the directions opposite to each other. On the front end of the head arm 3b, the head slider 4 including a transducer head for performing a data read/write to the disk 1 is mounted. Further, on the coil arm 3c, a voice coil 5a is mounted. The carriage 3 swings on the pivot 6 to move the head slider 4 in the inner-diameter direction of the disk 1 (in FIG. 1, the counterclockwise direction, and hereinafter designated as the ID direction), or in the outer-diameter direction of the disk 1 (in FIG. 1, the clockwise direction, and hereinafter designated as the OD direction).

The voice coil 5 is made up of the voice coil 5a, and a permanent magnet, not shown, which is fixed to the disk enclosure. The VCM 5 causes the carriage 3 to swing. The crash stop 7 consists of an outer crash stop 7a and an inner crash stop 7b, and defines the swingable range of the carriage 3 in cooperation with the coil arm 3c which abuts on them. The crash stop 7a defines the swingable limit on the OD direction side of the carriage 3, and the crash stop 7b defines the swingable limit on the ID direction side of the carriage 3.

The spindle driver 11 drives the spindle motor 2 according to an instruction from the MPU 10. The VCM driver 12 drives the VCM 5 by feeding a VCM current through the voice coil 5a according to an instruction from the MPU 10. To the spindle driver 11 and the VCM driver 12, the +5 [V] power and the +12 [V] power are supplied, respectively. The MPU 10 is operated by the +5 [V] power, and controls the spindle driver 11 to rotate the disk 1 at a preset rotational speed. The MPU 10 is also connected to the transducer head of the head slider 4, and recognizes the position of the head slider 4 based on the servo data read out from the data area 1a of the disk 1 by the transducer head, controls the VCM driver 12 to move the head slider 4 above a predetermined track of the data area 1, and causes the transducer head to write data to the data area 1a or read data from the data area 1a.

The MPU 10 and the VCM driver 12 stop their operations when the +5 [V] power is turned off. The spindle driver 11 stops the driving of the spindle motor 2 when the +12 [V] power is turned off and when the MPU 10 stops its operation (when the +5 [V] power is turned off). Accordingly, the disk 1 stops its rotation when either the +5 [V] power or the +12 [V] power is turned off. Further, the MPU 10 monitors the +12 [V] power, and causes the VCM driver 12 to stop its operation when the +12 [V] power is turned off. Thus, the VCM driver 12 stops the driving of the VCM 5 if either the +5 [V] power or the +12 [V] power is turned off.

The retract circuit 13 receives the current due to the back electromotive force generated by the spindle motor 2, and supplies the current due to the back electromotive force to the voice coil 5a as a retract current when the current due to the back electromotive force is equal to or smaller than a predetermined value, and if the current to the back electromotive force exceeds the predetermined value, clips the current due to the back electromotive force to the predetermined value or below, and supplies the clipped current to the voice coil 5a as the retract current to retract the head slider 4 to the landing area 1b.

Figure 2:
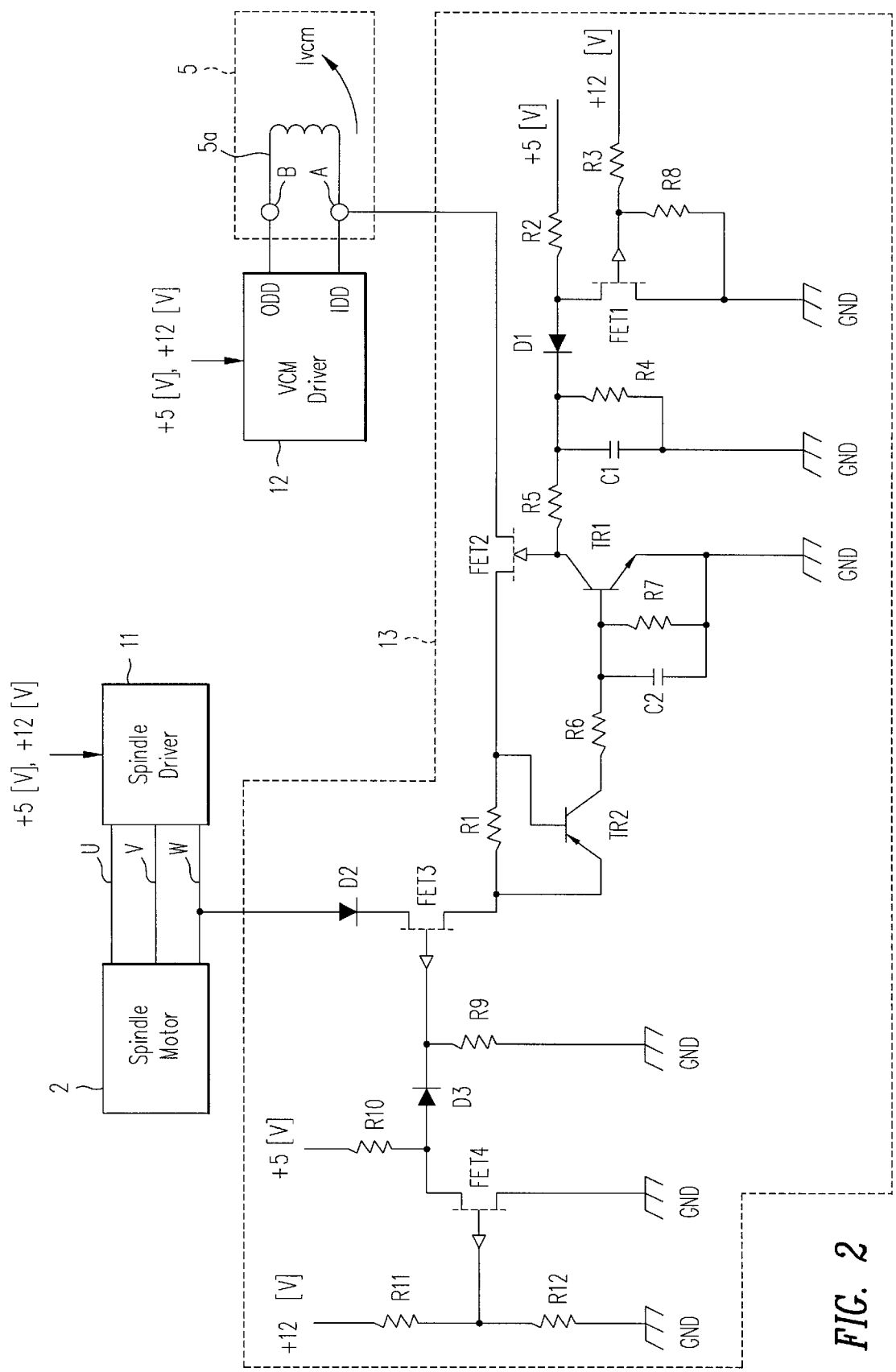
FIG. 2 is a circuit diagram showing the internal construction of the retract circuit in the disk device of the embodiment of the present invention.

FIG. 2 is a figure showing the internal structure of the retract circuit 13 and the connections with other circuits. In FIG. 2, the retract circuit 13 has diodes D1 to D3, transistors FET1 to FET4, TR1, and TR2, resistors R1 to R12, and capacitors C1 and C2. Further, in FIG. 2, the spindle driver 11 drives the spindle motor 2 by three phases of u-, v-, and w-phases. The spindle motor 2, when driven by the spindle driver 11, generates a back electromotive force in each of the u-, v-, and w-phases. The VCM driver 12 has the VCM current output terminal IDD and ODD. The terminal IDD of the VCM driver 12 is connected to the terminal A of the voice coil 5a, and the terminal ODD of the VCM driver 12 is connected to the terminal B of the voice coil 5a. The VCM current flowing in the direction of the arrow in the figure (terminals A→voice coil 5a→terminal B) is assumed to be a positive VCM current, and the VCM current flowing in the direction opposite to the arrow in the figure (terminal B→voice coil 5a→terminal A) is assumed to be a negative VCM current. If the positive VCM current is fed through the voice coil 5a, the carriage 3 (refer to FIG. 1) swings in the ID direction (the head slider 4 also moves in the ID direction). Further, if the negative VCM current is fed through the voice coil 5a, the carriage 3 swings in the OD direction (the head slider 4 also moves in the OD direction).

In the retract circuit 13 in FIG. 2, the transistors FET1, FET3, and FET4 are P-channel field effect transistors, and they are enhancement type FETs which are turned off when the gate potential is equal to or higher than the source potential. The transistor FET2 is an N-channel field effect transistor, and it is an enhancement type FET which is turned off when the gate potential is equal to or lower than the source potential. Further, the transistor TR1 is an NPN-type bipolar transistor, and the transistor TR2 is a PNP-type bipolar transistor. The anode electrode of the diode D2 is connected to the w-phase of the back electromotive force generated by the spindle motor 2, and the cathode electrode of D2 is connected to the source electrode of the transistor FET3. The gate electrode of the transistor FET3 is connected to the cathode electrode of the diode D3 and to a ground power GND via the resistor R9, and the drain electrode of the FET3 is connected to the emitter electrode of the transistor TR2 and to the drain electrode of the transistor FET2 via the resistor R1. The source electrode of the transistor FET4 is connected to the anode electrode of the diode D3 and to the +5 [V] power via the resistor R10, and the drain electrode of FET4 is connected to the ground power GND. The resistor R11 is provided between the gate electrode of the transistor FET4 and the +5 [V] power, and the resistor R12 is provided between the gate electrode of FET4 and the ground power GND. The transistor FET4 and the resistors R10 to R12 form a source follower circuit, and the resistors R11 and R12 bias the gate electrode of FET4 to +5 [V] or higher when they are supplied with the +12 [V] power.

The diode D2 and the transistor FET3 form a means for receiving the current due to a back electromotive force from the spindle motor 2. Further, the diodes D2 and D3, the transistors FET3 and FET4, and the resistors R9 to R12 form a means for receiving the current due to a back electromotive force from the spindle motor 2 when the +5 [V] power or the +12 [V] power is turned off.

The base electrode of the transistor TR2 is connected to the drain electrode of the transistor FET2, and the collector electrode of TR2 is connected to the base electrode of the transistor TR1 via the resistor R6. The emitter electrode of the transistor TR1 is connected to the ground power GND, and the collector electrode of TR1 is connected to the gate electrode of the transistor FET2 and to the cathode electrode of the diode D1 via the resistor R5. The source electrode of the transistor FET2 is connected to the terminal A of the voice coil 5a. The resistor R7 and the capacitor C2 are provided between the base electrode of the transistor TR1 and the ground power GND, and the resistor R4 and the capacitor C1 are provided between the cathode electrode of the diode D1 and the ground power GND.

The transistors TR1, TR2, and FET2 and the resistor R1 make up a means for clipping the current due to the back electromotive force to a predetermined value or below. The resistor R7 and the capacitor C2 are provided to stabilize the switching operations of the transistors TR1, TR2, and FET2. The clipping level of the current due to the back electromotive force depends on the resistance value of the resistor R1.

The source electrode of the transistor FET1 is connected to the anode electrode of the diode D1 and to the +5 [V] power via the resistor R2, and the drain electrode of FET1 is connected to the ground power GND. The resistor R3 is provided between the gate electrode of the transistor FET1 and the +12 [V] power, and the resistor R8 is provided between the gate electrode of FET1 and the ground power GND. The transistor FET1 and the resistors R2, R3, and R8 make up a source follower circuit.

The transistor FET2 forms a means for supplying a current equal to or smaller than the predetermined value to the voice coil 5a. Further, the transistors FET1 and FET2, the diode D1, the resistors R2 to R5 and R8, and the capacitor C1 form a means for supplying a current equal to or smaller than the predetermined value to the voice coil 5a until a predetermined time elapses when the +5 [V] power or the +12 [V] power is turned off, and stopping the supply of the current when the predetermined time elapses. In addition, the transistor FET2 makes up the means for receiving the current due to the back electromotive force and the means for supplying a current equal to or smaller than the predetermined value to the voice coil motor, but a transistor constituting each means may be separately provided.

Now, the operation of the disk device according to the embodiment of the present invention is described using FIGS. 1 and 2. First, description is made to the operation in which the device powers (the +5 [V] power and +12 [V] power) are turned on causing the head slider 4 to enter over the data area 1a of the disk 1. Before the device powers are turned on, the disk 1 is not rotating, and the head slider 4 is on the landing area 1b. When the device powers are turned on, the spindle driver 11 drives the spindle motor 2, and the disk 1 starts to rotate. This causes the head slider 4 float over the landing area 1b. When the rotational speed of the disk 1 reaches a preset rotational speed (for instance 7200 [rpm] or 5400 [rpm]), the MPU 10 controls the VCM driver 12, which feeds a negative VCM current through the voice coil 5a. This causes the carriage 3 to swing in the OD direction, and the head slider 4 enters above the data area 1a. The MPU 10 recognizes the position of the head slider 4 based on the servo data read in from the data area 1a by the transducer head of the head slider 4, and it controls the VCM driver 12 when instructed from a host, not shown, to execute a disk operation such as a data write or data read. For a data write or data read, the VCM driver 12 feeds a negative or positive VCM current through the voice coil 5a, thereby to cause the head slider 4 to move over the disk data area 1a in the OD or ID direction and to be positioned at a predetermined data track of the data area 1a.

When the +5 [V] power and the +12 [V] power are both on, the gate electrode of the transistor FET4 is biased to a positive potential in the retract circuit 13 to keep FET4 off. Since FET4 is off, the anode electrode of the diode D3 is biased to +5 [V] by the resistor R10 to keep D3 on. Further, since D3 is on, the gate of the transistor FET3 is biased to nearly +5 [V] to keep FET3 off. On the other hand, the diode D2 performs a half-wave rectification of the voltage due to the w-phase which is one phase of the three-phase back electromotive force generated by the spindle motor 2. This pulsating voltage having undergone a half-wave rectification is provided to the source electrode of the transistor FET3. However, when the +5 [V] power and the +12 [V] power are both on, FET3 is off as described above, and the current supply path for the voice coil 5a is shut off, so that the retract circuit 13 does not supply the current due to the back electromotive force to the voice coil 5a.

Further, since FET3 is off and the current due to the back electromotive force does not flow through the resistor R1, the emitter electrode of the transistor TR2 takes the same potential as the base electrode to keep TR2 in an off-sate. Since TR2 is off, the base electrode of the transistor TR1 has the same ground potential as the emitter electrode to keep TR1 off. On the other hand, the gate electrode of the transistor FET1 is biased to a positive potential to keep FET1 off. Further, since the anode electrode of the diode D1 is biased to +5 [V] by the resistor 2, D1 is on, the cathode electrode of D1 is nearly +5 [V], and the capacitor C1 is charged. Furthermore, since the transistor TR1 is off and the diode D1 is on, the gate electrode of the transistor FET2 is biased to nearly +5 [V], and FET2 is on.

Description is now made to the operation in which the +5 [V] power or the +12 [V] power is turned off (also including the case in which both the +5 [V] power and the +12 [v] power are turned off) and the head slider 4 is retracted to the landing area 1b of the disk 1. As described above, the spindle driver 11 stops the driving of the spindle motor 2 if the +5 [V] power or the +12 [V] power is turned off, but the disk 1 continues to rotate for a while by its own inertia after the driving of the spindle motor 2 is stopped, and thereafter stops its rotation. Thus, the spindle motor 2 continues to generate a back electromotive force until the disk 1 stops its rotation after the turning-off of the power. Further, if the +5 [V] power or the +12 [V] power is turned off, the VCM driver 12 opens the terminal IDD and connects the terminal ODD to the ground power GND, and stops its operation.

In the retract circuit 13, since the gate electrode of the transistor FET4 has the ground potential when the +12 [V] power is turned off, regardless of whether the +5 [V] power is on or off, FET4 is turned on to turn off the diode D3, and thus the gate electrode of the transistor FET3 is provided with the ground potential by the resistor R9, thereby to turn on FET3. Further, since the gate electrode of the transistor FET1 is put at the ground potential, FET1 is turned on to provide the ground potential to the anode electrode of the diode D1, and thus the diode D1 is turned off and the capacitor C1 starts to discharge. On the other hand, since the diode D3 is similarly turned off when the +5 [V] power is turned off, regardless of whether the +12 [V] power is on or off, FET3 is turned on, and the capacitor C1 starts to discharge since the diode D1 is turned off. Accordingly, if the +5 [V] power or the +12 [V] power is turned off, the transistor FET3 is turned on, and the diode D1 is turned off to cause the capacitor C1 to start to discharge. In addition, the transistor FET2 is kept to be on by the capacitor C1 even if the diode D1 is turned off.

When the transistor FET3 is turned on, the pulsating current due to the back electromotive force which has experienced the half-wave rectification by the diode D2 flows through the transistor FET3 and the resistor R1, and reaches the drain electrode of the transistor FET2. If the instantaneous value of the above pulsating current is equal to or smaller than a predetermined value Ibe (=Vbe/R1) determined by the resistance value of the resistor R1 and a voltage Vbe (=0.5 to 0.6 [V]) necessary for turning on the transistor TR2, and the voltage drop across the resistor R1 is equal to or lower than the above voltage Vbe, then the transistor FET2 continuously remains to be on, and the above pulsating current is supplied to the voice coil 5a as a retract current via the source electrode of FET2. This retract current is a positive VCM current.

However, if the instantaneous value of the above pulsating current exceeds the predetermined value Ibe and the voltage drop across the resistor R1 exceeds the above voltage Vbe, the transistor TR2 is turned on to instantaneously turn off the transistor FET2. That is, the transistor TR2 is turned on, and the above pulsating current branches to the base electrode of the transistor TR1 via TR2 and the resistor R6 to turn on TR1, thereby to cause the gate electrode of the transistor FET2 to be at the ground potential for instantaneously turning off FET2. The pulsating current supply path is shut off by the turning-off of FET2, and the pulsating current instantaneously decreases. And, if the pulsating current decreases to the predetermined value Ibe or below, the transistor TR2 is turned off again to turn off the transistor TR1, by which the gate electrode potential of the transistor FET2 is restored to a positive potential to turn on FET2 again. This switching operation of FET2 clips the current flowing through the source electrode of FET2 to the predetermined value Ibe or below. And, the current clipped to the predetermined value Ibe or below is supplied to the voice coil 5a as a retract current. The capacitor C2 and the resistor R7 are provided to stabilize the switching operations of the transistors TR1, TR2, and FET2, as described above. When the transistor TR2 is turned on, the capacitor C2 is charged. The capacitor C2 starts to discharge when TR2 is turned off, and turns on the transistor TR1 after a predetermined delay time elapses since the turning-off of TR2.

As described above, the retract circuit 13 receives the current due to a back electromotive force from the spindle motor 2 if the +5 [V] power or the +12 [V] power is turned off, and if the instantaneous value of the current due to the back electromotive force exceeds the predetermined value Ibe, turns off the transistor FET2 to clip the current due to the back electromotive force to the predetermined value Ibe or below, and supplies this current equal to or smaller than the predetermined value Ibe to the voice coil 5a as the retract current.

By the retract current supplied from the retract circuit 13, the VCM 5 rotates the carriage 3 in the ID direction. If the coil arm 3c of the carriage 3 bumps against the crash stop 7b, a mechanical lock mechanism causes the carriage 3 to stop its rotation. By this, the head slider 4 is retracted to above the landing area 1b. Since the above retract current is clipped to the predetermined value Ibe depending on the resistance value of the resistor R1 even if the preset rotational speed of the spindle motor 2 is large, the swing speed of the carriage 3 is also limited by this, and the carriage 3 is prevented from bumping against the crash stop 7b at an excessive speed.

After the head slider 4 is retracted, the discharging of the capacitor C1 reduces the gate potential of the transistor FET2 to a threshold value or below in the retract circuit 13, FET2 continuously remains to be off regardless of whether the transistor TR2 is on or off. This causes the retract circuit 13 to stop the supplying of the retract current to the voice coil 5a. Further, the head slider 4 lands on the landing area 1b when the disk 1 stops its rotation.

Figure 3A:
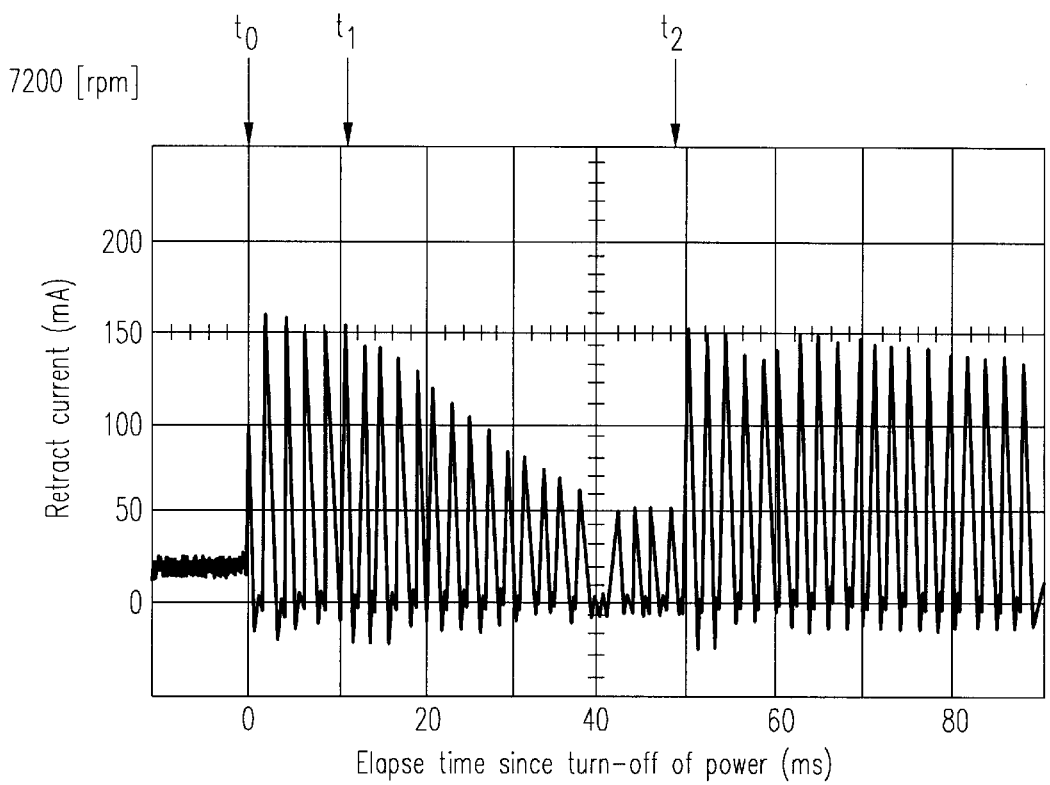
FIGS. 3a and 3b are graphs showing the time profiles of the retract current in the disk device of the embodiment of the present invention.
Figure 3B:
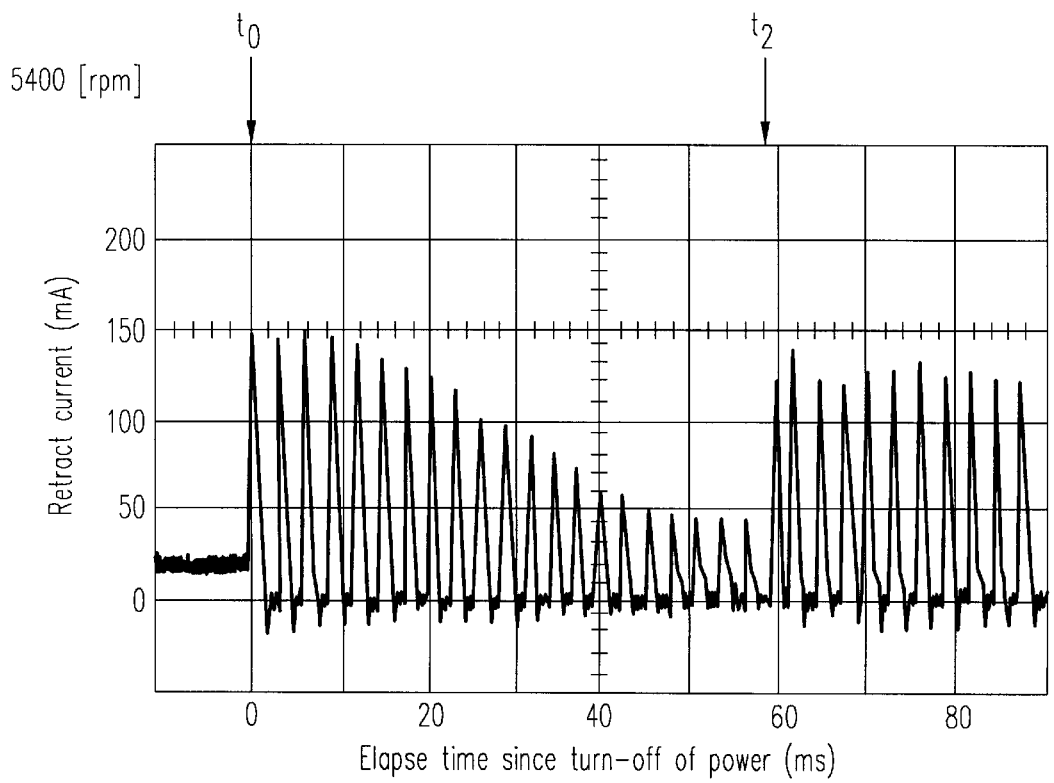

FIGS. 3a and 3b are graphs showing the time profiles of the retract current in the disk device of the present invention which uses the retract circuit 13 of the present invention, in which 3a shows the case in which the preset rotational speed of the spindle motor, and hence the preset rotational speed of the disk is 7200 [rpm], and 3b shows the case in which the preset rotational speed of the disk is 5400 [rpm]. The above preset rotational speeds are stored in the MPU 10 as microcode parameters. Accordingly, the disk device having the preset rotational speed of 7200 [rpm] and the disk drive having the preset rotational speed of 5400 [rpm] are different only in the contents of the microcode parameters of the MPU 10, which are written in the factory.

Figure 4A:
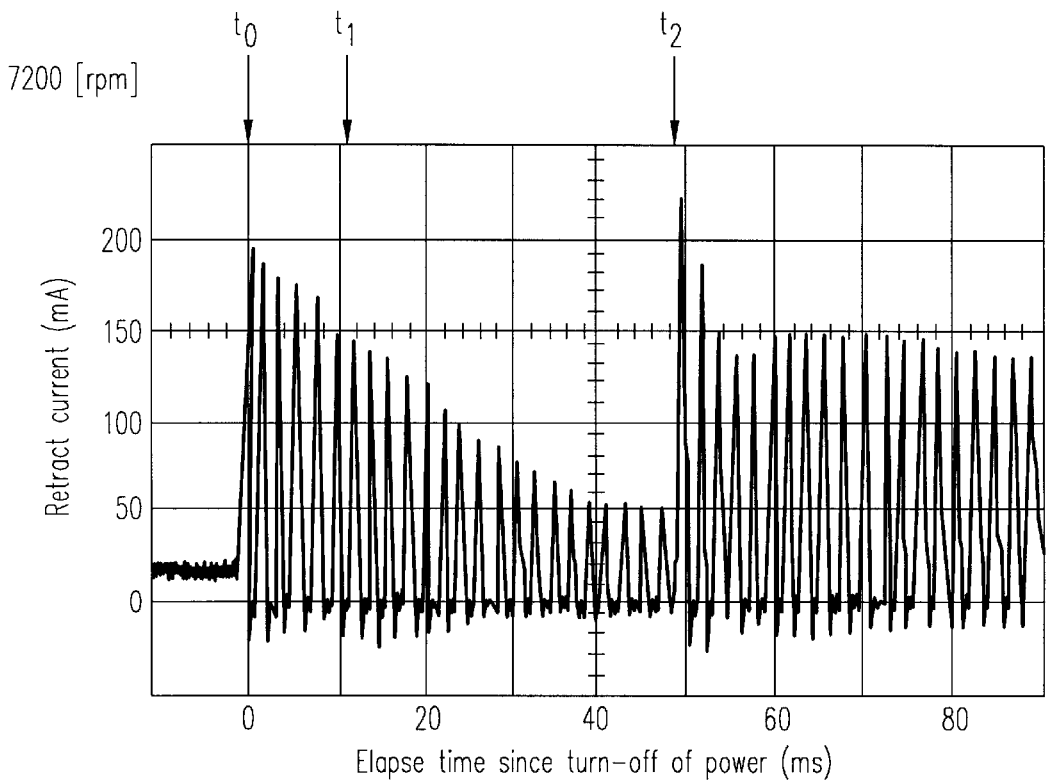
FIGS. 4a and 4b are graphs showing the time profiles of the retract current in the conventional disk device.
Figure 4B:
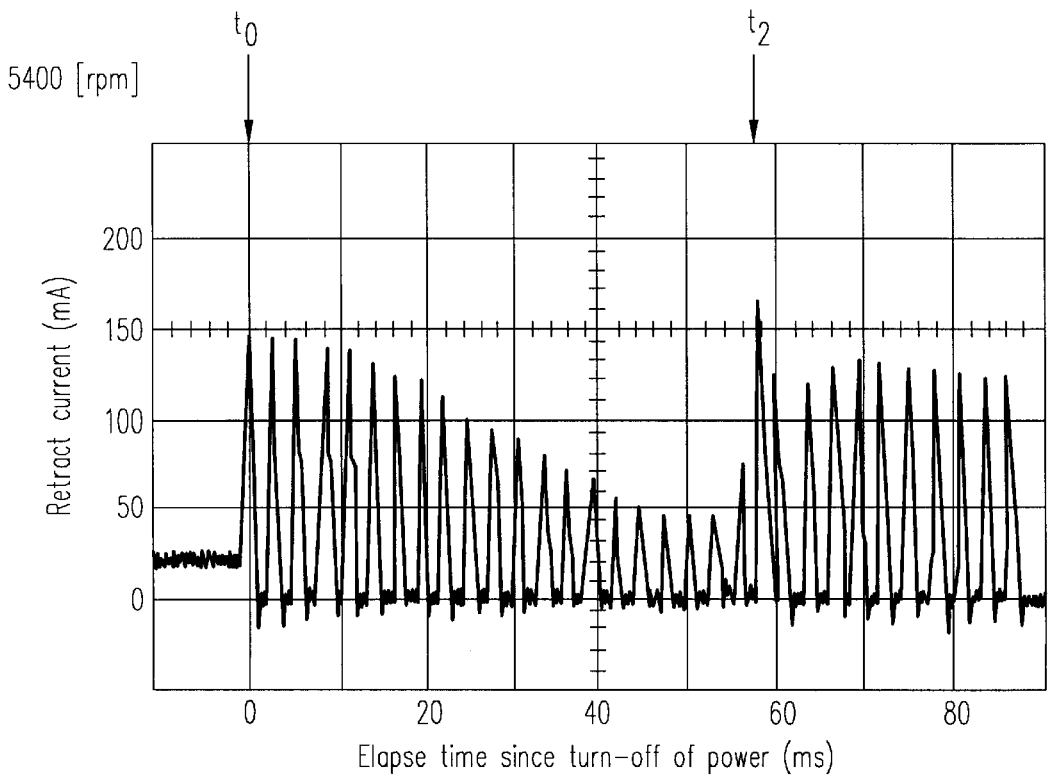

Further, FIGS. 4a and 4b are graphs showing the time profiles of the retract current in the conventional disk device using the conventional retract circuit, in which 4a shows the case in which the preset rotational speed of the disk is 7200 [rpm], and 4b shows the case in which the preset rotational speed of the disk is 5400 [rpm]. The conventional retract circuit is the same as the retract circuit 13 in FIG. 2 except that the transistors TR1 and TR2, the resistors R6 and R7, and the capacitor C2 are removed. Further, the conventional disk device is the same as the disk device of the present invention except they are different in the retract circuit.

It is assumed that the resistance value of the resistor R1 in the retract circuit 13 of the present invention and the conventional retract circuit is 3 [ohm]. Further, in the retract circuit 13, the one whose turn-on voltage Vbe is about 0.5 [V] was used as the transistor TR2. Accordingly, the predetermined value Ibe (=Vbe/R1), which is the clipping level, is about 160 [mA]. In addition, in the conventional retract circuit, the transistor FET2 is continuously kept to be on when the device power is turned off, regardless of the magnitude of the pulsating current due to a back electromotive force which is received from the spindle motor 2 (the output current of the transistor FET3), and the pulsating current due to the back electromotive force is supplied to the voice coil 5a via the resistor R1 and the transistor FET2.

In FIGS. 3a–3b and 4a–4b, the +5 [V] power is turned off at time t0 to initiate the retract operation of the head slider 4, and during the period of t0–t2, the retract current supplied from the retract circuit causes the VCM 5 to swing the carriage 3 in the ID direction (move the head slider 4 to the landing area 1b of the disk 1), and at time t2, the coil arm 3c of the carriage 3 bumps against the crash stop 7b and the carriage 3 stops its rotation (the head slider 4 stops over the landing area 1b).

Further, before time t0, the disk 1 is rotated by the spindle motor 2 at the preset rotational speed (7200 [rpm] in 3a and 4a, and 5400 [rpm] in 3b and 4b), and when the spindle driver 11 stops the driving of the spindle motor 2 at time t0, the rotational speed of the disk 1 gradually decreases, and the disk 1 stops its rotation after time t2 when the retraction of the head slider 4 is completed. Accordingly, the back electromotive force generated by the spindle motor 2 gradually decreases after time t0, and the peak value of the pulsating current due to the back electromotive force which is received by the retract circuit from the spindle motor 2 also gradually decreases after time t0. In addition, the peak values of the retract currents shown in FIGS. 3a–3b and 4a–4b intermittently becomes large at time t2 for the following reason. The swing of the carriage 3 causes the voice coil 5a of the VCM 5 to generate a back electromotive force. When the carriage 3 stops the swinging, the voice coil 5a stops the generation of the back electromotive force. Accordingly, when the carriage 3 is swinging, the impedance of the voice coil 5a becomes large as compared with when it is at rest, and the retract current difficultly flows.

In FIG. 3a and FIG. 4a in which the preset rotational speed of the disk is 7200 [rpm] during the period of t0–t1, the peak value of the pulsating current due to a back electromotive force which is received from the spindle motor 2 exceeds the clipping level Ibe (about 160 [mA]) preset in the retract circuit 13 of the present invention. In the conventional disk drive storage device, during the period of t0–t1, the peak value of the retract current supplied to the voice coil 5a exceeds the above clipping level Ibe (FIG. 4a), while, in the retract circuit 13 of the present invention, during this period, the switching operation of the transistor FET2 enables the current clipping function to work, and the peak value of the retract current is controlled to be at the above clipping level Ibe (FIG. 3a).

Further, in FIG. 3b and FIG. 4b in which the preset rotational speed of the spindle motor 2 is 5400 [rpm], since the peak value of the pulsating current due to the back electromotive force never exceeds the above clipping level Ibe after time t0 and the above current clipping function does not work in the retract circuit 13 of the present invention, the retract current waveform of the disk device of the present invention (FIG. 3b) and the retract current waveform of the conventional disk device are substantially the same.

Accordingly, the swing speed of the carriage 3 when it bumps against the crash stop 7b is substantially the same in the disk device of the present invention and the conventional disk device for the disk's preset rotational speed of 5400 [rpm], but smaller in the disk device of the present invention than in the conventional disk device for the preset rotational speed of 7200 [rpm]. That is, if the retract circuit 13 of the present invention is shared between a plurality of disk devices different in the preset rotational speed of the spindle motor 2, the shock to the carriage 3 and the head slider 4 which is given when the carriage 3 bumps against the crash stop 7b in the retraction can be limited to a constant value in each disk device, and thus the reliability of the disk device can be increased. Further, the use of the card assembly 14 on which the retract circuit 13 of the present invention is mounted eliminates the necessity for preparing a separate card assembly for each of a plurality of disk devices different in the preset rotational speed of the spindle motor 2, and one card assembly can be commonly used for them, so that the cost of the disk devices can be reduced.

As described above, in accordance with the embodiment of the present invention, by forming a plurality of disk devices having different preset disk rotating speeds, and sharing the retract circuit 13 comprising a means for clipping the current due to a back electromotive force which is received from the spindle motor 2 to a predetermined value or below, and supplying a retract current equal to or smaller than the predetermined value to the voice coil regardless of the preset rotational speed of the spindle motor 2, the reliability of each disk device can be increased. Moreover, since the card assembly 14 on which the retract circuit 13 is mounted can be commonly used for a plurality of disk devices different in the preset disk rotating speed, the cost of the disk devices can be reduced.

In addition, since the MPU 10 continues to operate when only the +12 [V] power is turned off, the retract current may be supplied to the voice coil 5a from the VCM driver 12 to retract the head slider 4 without operating the retract circuit 13.

Further, in the above embodiment, the retract circuit 13 is applied to a contact start stop disk device, but the retract circuit 13 of the present invention may be applied to a disk device having a load/unload mechanism. The contact start stop disk device is the one in which the head slider is made to land on a landing area provided in the disk surface. In the above embodiment, the landing area is provided on the inner periphery side of the disk, but the landing area may be provided on the outer periphery side of the disk. In addition, the load/unload mechanism is a mechanism in which a part called a ramp is fixedly provided on the disk enclosure, and the head arm of the carriage is supported by the ramp, thereby to unload the head slider to the outside of the space in which the disk is disposed.

As described above, in accordance with the present invention, there are advantages that, by limiting the current due to a back electromotive force which is received from the spindle motor to a predetermined value or below, and supplying the current equal to or smaller than the predetermined value to the voice coil, the reliability of the disk device can be increased and the cost of the disk device can be reduced.

What is claimed is:
1. A disk drive storage device comprising:
   a disk recording medium;
   a spindle motor for rotating said disk recording medium;
   a transducer head for performing a data read/write to said disk recording medium;

a carriage for supporting said transducer head;
a voice coil motor for driving said carriage; and,
 a circuit for supplying the current due to a back electromotive force generated by said spindle motor to said voice coil motor, said circuit comprising:
means for receiving the current due to the back electromotive force from said spindle motor;

means for limiting the received current to a predetermined value or below; and, means for supplying said current of the predetermined value or below to said voice coil motor.

\* \* \* \* \*